Dec. 28, 1954

A. H. JORDAN 2,698,025

AIR OPERATED CONTROLLER

Filed March 4, 1949

INVENTOR.
ARTHUR H. JORDAN

BY

ATTORNEY.

Dec. 28, 1954    A. H. JORDAN    2,698,025
AIR OPERATED CONTROLLER
Filed March 4, 1949    4 Sheets-Sheet 2

INVENTOR.
ARTHUR H. JORDAN
BY
Arthur H. Swanson
ATTORNEY.

Dec. 28, 1954  A. H. JORDAN  2,698,025
AIR OPERATED CONTROLLER
Filed March 4, 1949  4 Sheets-Sheet 3

INVENTOR.
ARTHUR H. JORDAN
BY
Arthur H. Swanson
ATTORNEY.

Dec. 28, 1954  A. H. JORDAN  2,698,025
AIR OPERATED CONTROLLER
Filed March 4, 1949  4 Sheets-Sheet 4

INVENTOR.
ARTHUR H. JORDAN
BY
*Arthur H. Swanson*
ATTORNEY.

United States Patent Office 2,698,025
Patented Dec. 28, 1954

2,698,025

AIR OPERATED CONTROLLER

Arthur H. Jordan, near Level Road, Norristown, Pa., assignor to Minneapolis-Honeywell Regulator Company, Minneapolis, Minn., a corporation of Delaware Application March 4, 1949, Serial No. 79,584

5 Claims. (Cl. 137—413)

This invention relates to air-operated controllers particularly those responsive to a float-operated measuring instrument.

One object of this invention is to provide an air-operated controller responsive to a measuring element and having an air-operated pilot or relay, in which controller there is provided between the measuring instrument and the pilot or relay a pair of pivoted levers which have an adjustable connection between them which can be adjusted to compensate for the specific gravity of the liquid being measured.

A further object of this invention is to provide an air-operated controller responsive to a measuring instrument, particularly a float-operated measuring instrument, and having a pilot or relay governing the final control element in which controller there is provided an air-operated power amplifier or booster between the measuring element and the pilot or relay so that the sensitive movements of the measuring instrument are not interfered with but only supply sufficient power to move an exhaust valve, which may be of the flapper and nozzle type, which requires but a negligible amount of power to actuate but which can control substantial amounts of power.

Yet a further object of this invention is to provide a controller having a measuring instrument, especially a float operated measuring instrument, and a pilot or relay governing a final control element, in which controller said measuring instrument actuates one of a pair of pivotally mounted levers, there being provided a cam affording the operating connection between said levers, the driven one of said levers directly actuating the inlet and exhaust valve mechanism of a second air-operated pilot or relay valve which acts as a power amplifier or booster.

This controller is of the null-balance type and has the following advantages:

1. The driving and driven levers always balance to the same position so that any non-linearity of springs or lever mechanism will not affect accuracy.
2. The buoyancy force of a float can be fully utilized.
3. The gradient of the suppression spring and the proportions of the float operated lever can be selected to give more sensitivity.

Because each element of the controller is utilized to its fullest extent, less space is required.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
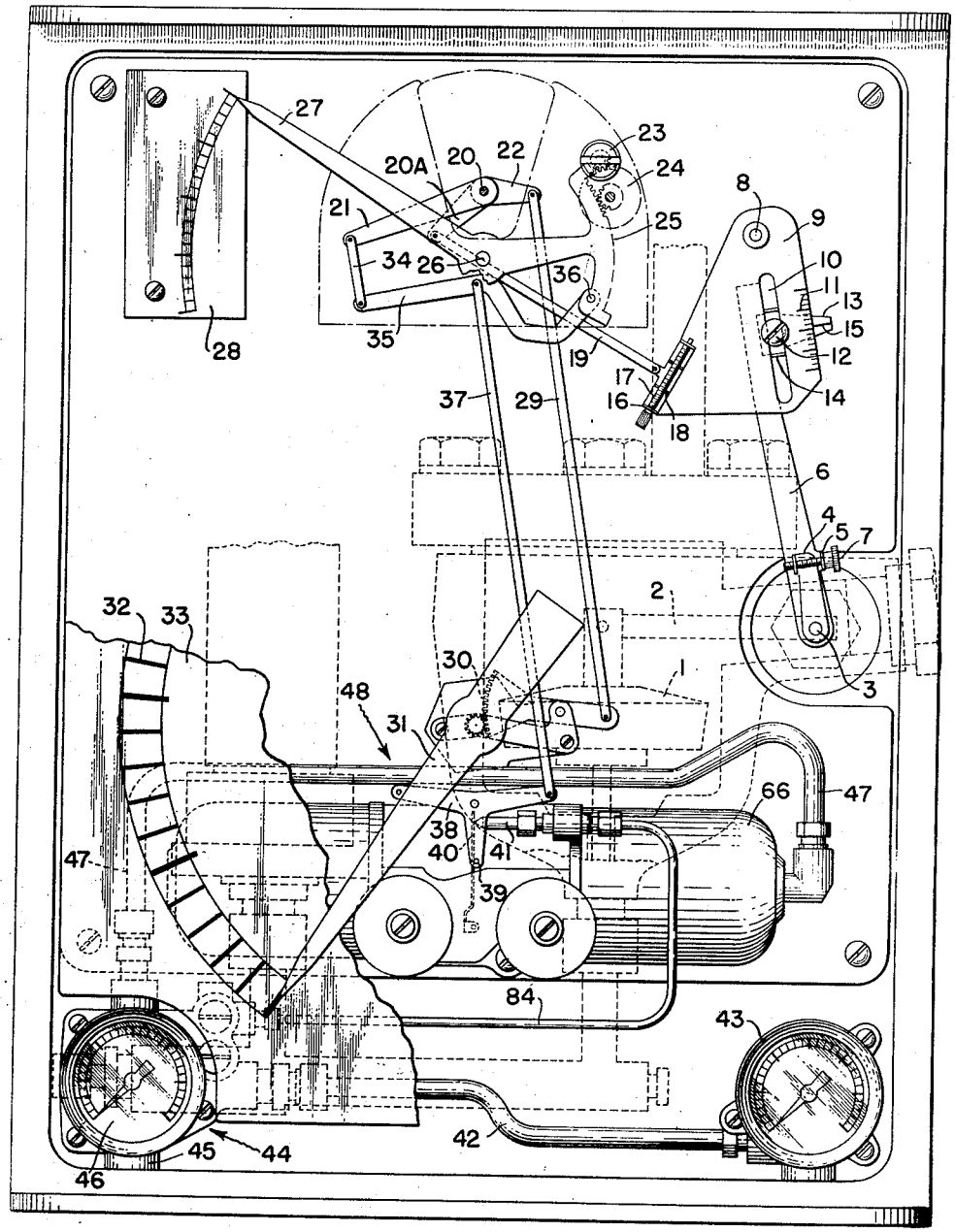
Figure 1 is a front elevation of the controller with the front face broken away to expose parts behind it.

Fig. 1 shows the controller applied to a float-operated measuring instrument, such as a flow meter or a liquid level controller. In such a device, the float 1 raises and lowers one end of a lever 2 to which the float is pivotally attached. The opposite end of lever 2 is attached to a pressure tight bushing, such as a torque tube. This bushing permits the motion of the float to be transmitted out of the pressure tight casing of the measuring instrument. The output of this pressure tight bushing is a shaft 3 which operates an arm 4 having adjustable connection with a pair of ears 5 on a lever arm 6 by means of a manually-adjustable screw 7.

Adjacent the opposite end of lever 6 is mounted on pivot 8 a third lever 9 having a slot 10 in it and a plurality of indicating markings 11 along one edge.

Between levers 6 and 9 is a screw 12 which holds a connector 13 having ears 14 and a locating line 15 on it Ears 14 are slidable in slot 10 and pivoted with respect to lever 6 so as to vary the point of connection between levers 6 and 9. This variation is indicated by the location of line 15 with respect to the markings 11. This adjustment may be used to compensate for the specific gravity of the liquid being measured by the float 1. The mode of operation of this specific gravity adjustment is explained below.

Lever 9 also carries ears 16 through which pass screw 17 which also pass through a second pair of ears 18 on a carriage which supports a connecting link 19.

The opposite end of link 19 is pivotally connected to an arm 20A of a three-arm lever mounted on pivot 20. Arm 21 of this three-arm lever forms one input to a differential.

Another input to this differential is formed by a manually-operable set point adjustment comprising an operating screw 23 which drives a gearing 24 which meshes with a segment 25 forming part of a lever pivoted at 26 and having an indicating arm 27 cooperating with a scale 28 to provide an indication of the point at which the controller is set to operate.

Arm 22 of the three-arm lever has pivotal engagement with a link 29 operating gearing 30 so as to turn indicating pointer 31 so that one end of pointer 31 cooperates with scale 32 on the front plate 33.

The differential is formed by a connecting link 34 pivoted at one end to arm 21 and at its opposite end to a floating lever 35 whose opposite end is connected to segment 25 by means of pin 36.

The output of the differential is formed by a link 37 pivotally connected to floating lever 35 at one end and, at its opposite end, connected to a second three-arm lever 38 which bears a pin 39 adapted to operate a flapper valve 40 with respect to a nozzle 41.

Flapper 40 and nozzle 41 forms part of an air-operated controller having an air inlet pipe 42 in which is located a pressure gauge 43. The air inlet pipe ends at a pilot or relay valve generally indicated at 44 and having an air outlet 45 and a pressure gauge 46 connected to said air outlet. The details of this pilot or relay valve are shown in greater detail in Fig. 4 which is a schematic drawing.

The outlet of pilot or relay valve 44 is fed through a pipe 47 to one end of an air-operated reset and rate device, generally indicated at 48. Reset and rate device 48 is also shown in greater detail in Fig. 4.

The operation of the modification shown in Fig. 1 is obvious but may be stated to be as follows: A rise or fall of float 1 in response to a change in level of the liquid whose free surface is being measured and controlled, or whose free surface varies in response to a variable being controlled, causes a corresponding deflection of shaft 3 by means of the pressure tight bushing. This deflection of shaft 3 is transmitted through lever 6, lever 9, link 19, arm 21, link 34, floating lever 35, link 37, three-arm lever 38, and pin 39 to flapper 40. At the same time this movement of float 1 is transmitted by arm 22, link 29 and gearing 30 to pointer 31 which indicates the instantaneous position of float 1 by reference of the end of pointer 31 to scale 32.

The movement of flapper 40 relative to nozzle 41 controls a flow of air through the pilot or relay valve 44 and its outlet pipe 45 to the motor 49 (Fig. 4) of a final control element such as a valve 50. At the same time, the output pressure from the pilot or relay valve 44 is fed back through pipe 47 to the reset and rate device 48 which causes pin 39 to be actuated so as to give reset and rate action to the flapper 40 in a manner well understood for this type of mechanism.

The specific gravity adjustment operates as follows: Float 1 operates flapper 40 through the linkage disclosed and, consequently, governs the air pressure applied to diaphragm motor 49, which operates the final control valve 50. Float 1 moves not only in response to the movement of the free surface of the liquid to which it is exposed but also in response to any change in weight of the liquid displaced by float 1 and therefore to any change in the specific gravity of this liquid. The position of connector 13 in effect determines the length of the linkage between the float or measuring instrument 1 and flapper 40, or, more specifically, the effective radius of lever 6 about the axis of shaft 3 and the effective radius of lever plate 9 about its pivot 8. Obviously, the effective leverage of arm 6 varies inversely to the effective leverage of lever plate 9. The amount that a given change in position of float 1 changes the air pressure applied to diaphragm motor 49 depends upon the length of the linkage between shaft 3 and flapper 40 which depends, in turn, upon the ratio of the effective lengths of lever arms 6 and 9. Therefore, when the float 1 is to be used to measure the level of a liquid of a particular specific gravity, the connector 13 must be adjusted to compensate for this specific gravity. This is done by loosening screw 12, adjusting location line 15 with respect to indicating markings 11, and then tightening screw 12 to fasten connection 13 in the proper position to give the desired ratio of effective leverage to lever arms 6 and 9.

Figure 2:
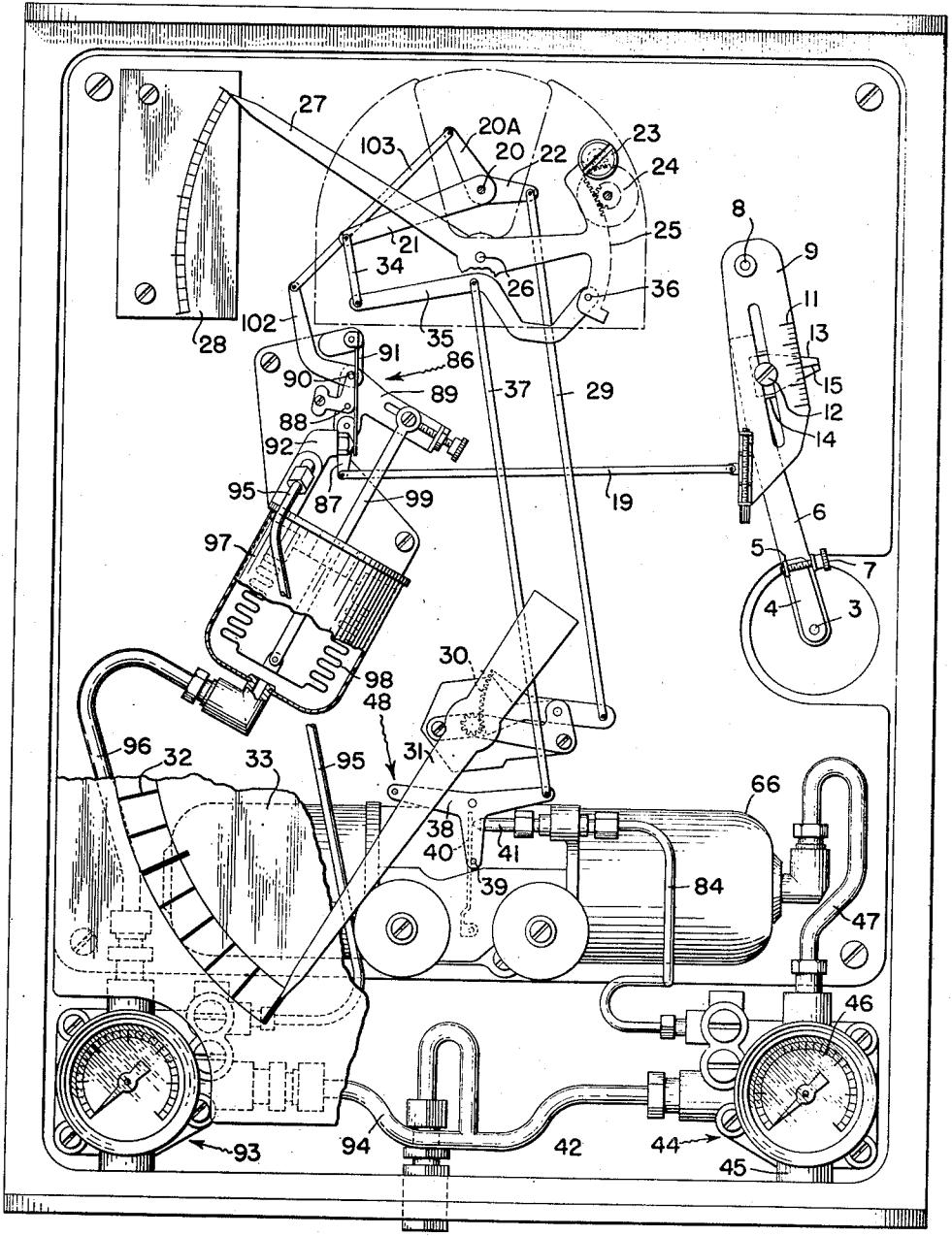
Figure 2 is a view of a modification in front elevation with the front face and a portion of the pneumatic receiver housing broken away.

Fig. 2 shows a controller similar to that shown in Fig. 1 but modified by the provision of an air-operated power amplifier or booster between the shaft 3 and the differential. The shaft 3 may be operated by any convenient measuring instrument, such as the float 1 (Fig. 1). Lever 6 actuates lever 9 mounted on pivot 8. Lever 9, in turn, actuates link 19 which, however, does not directly actuate the three-arm lever mounted on pivot 20. Instead, link 19 forms one input to a second differential generally indicated at 86 and having a lever 87 which is pivotally mounted on a pin 88, which, in turn, is pivotally mounted on a plate 89. A flapper-actuating pin 90 moves a flapper 91 cooperating with a nozzle 92 so that the flapper and nozzle constitute an exhaust valve. A pilot or relay generally indicated at 93 is supplied with air through a branch pipe 94. The motor for actuating pilot or relay valve 93 is connected by means of pipe 95 with the nozzle 92 so that any variation in the escape of air through the nozzle 92 causes the motor of pilot 93 to operate. The outlet air from pilot 93 is connected by pipe 96 to an air-operated motor comprising a casing 97 which surrounds a bellows 98. To the outer or exposed face of bellows 98 is pivotally connected one end of a link 99 whose other end is pivotally connected to plate 89.

Plate 89 has an output arm 102 which is connected by means of a link 103 to the arm 20A of the three-arm lever mounted on pivot 20.

This three-arm lever forms one input to a differential similar to that described in Fig. 1 and having the same reference characters. The other input to this differential is supplied manually by means of the screw or thumb nut 23 through the gearing 24, the segment 25. The output of this differential is a link 37 which operates a second three-arm lever 38 carrying on it a flapper actuating pin 39 adapted to actuate flapper valve 40 which cooperates with nozzle 41. Nozzle 41 controls the motor of the pilot or relay valve, generally indicated at 44. Pilot 44 has an outlet 45 for connection to the air-operated diaphragm or similar motor for the final control element.

Arm 22 of the three-arm lever mounted on pivot 20 is pivotally connected to link 29 which actuates gearing 30 so as to turn pointer 31 and thereby move the end of pointer 31 over the scale 32 to indicate the instantaneous position of the measuring instrument which supplies torque to shaft 3.

The operation of the modified controller shown in Fig. 2 is as follows: Upon a change in the value of the variable to which the measuring instrument is responsive, shaft 3 is rotated in one direction or the other. This rotation is transmitted through levers 6 and 9 and link 19 to the differential 86. Pin 90 moves flapper 91 with relation to nozzle 92 and thus operates the exhaust valve which controls the motor of pilot or relay 93 by the flow of air through pipe 95. Any change in the output pressure of pilot or relay 93 is transmitted through pipe 96 to the interior of casing 97 where it causes movement of bellows 98, or link 99 and plate 89, to cause a proportioning action on flapper-actuating pin 90. Movement of plate 89 is transmitted through arm 102 and link 103 to the three-arm lever mounted on pivot 20. By means of arm 22, link 29, gearing 30 and pointer 31, the instantaneous position of the measuring instrument attached to shaft 3 is indicated by the end of pointer 31 with reference to scale 32. Simultaneously, any movement of the measuring instrument transmitted to the three-arm lever pivoted at 20 is transmitted through connecting link 34, floating lever 35, link 37 and three-arm lever 38 to flapper-actuating pin 39 which causes movement of flapper 40 relative to nozzle 41 and consequent movement of pilot or relay 44, which, by means of outlet 45, controls the air-operated motor of the final control element.

Figure 3:
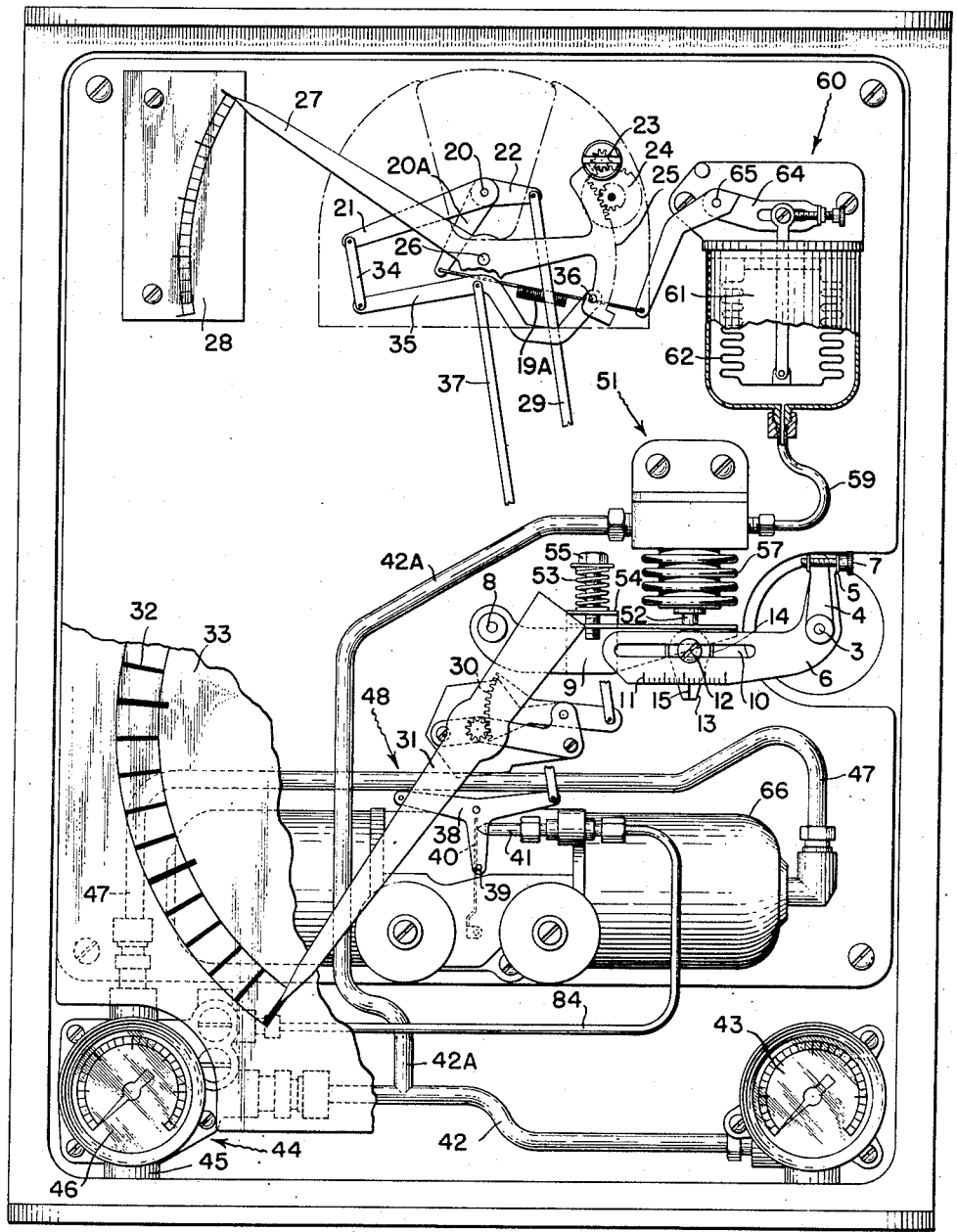
Figure 3 is a view of a second modification in front elevation with the face and a portion of the pneumatic receiver housing broken away.
Figure 4:
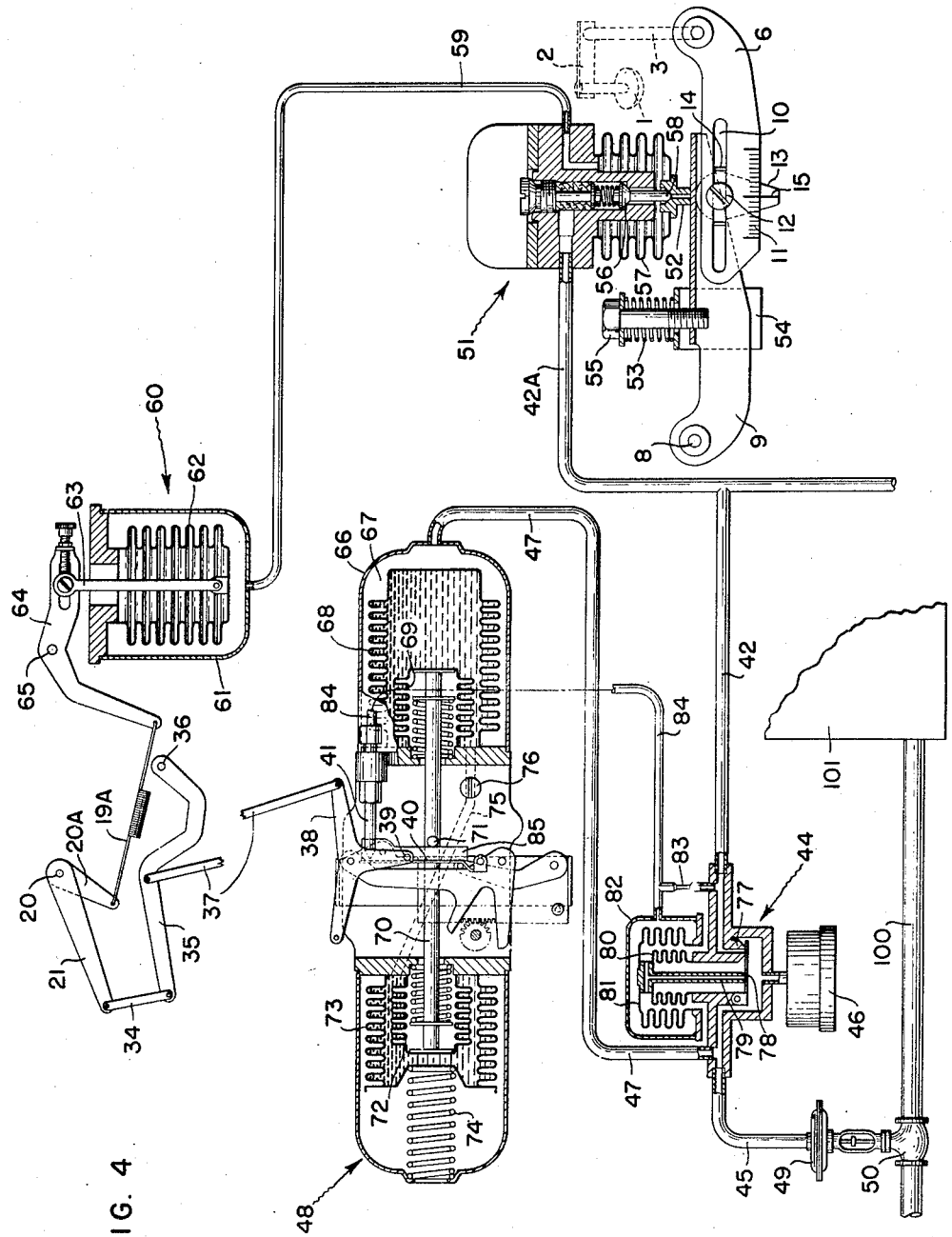
Figure 4 is a schematic view of the modification shown in Fig. 3 with parts shown in longitudinal cross section.

Figs. 3 and 4 show a second modification of the controller of this invention. In this modification variable adjustment for the levers has a cam face which directly operates a pilot or relay valve forming part of the air-operated power amplifier or booster system.

Fig. 4 shows the float 1 pivotally connected to a lever 2 the opposite end of which is fast on shaft 3 by means of a pressure tight bushing, such as a torque tube connection (not shown). Lever 6 is fast on the outer end of shaft 3 and has in it a slot 10 and on it indicating markings 11.

Mounted on pivot 8 is lever 9 which cooperates with the outlet nozzle 52 of pilot or relay valve, generally indicated at 51. Lever 9 is stressed in upward or counter-clockwise direction by a spring 53 which bears at its lower end against a stationary bracket 54 and at its upper end against a bolt 55 secured at its lower end to a flange on lever 9. The inlet pipe 42 has a branch 42A which provides the air inlet to the valve 51. Valve 51 has a frusto-conical valve member 56 which cooperates with a stationary seat to form an inlet to the interior of bellows 57. The inner end of nozzle 52 is formed as a valve seat movable with the free end of bellows 57 to cooperate with valve member 58 which controls the outlet or escape of air through outlet nozzle 52. Spring 53 causes lever 9 to engage outlet nozzle 52 with insufficient force to block the escape of air through outlet nozzle 52 when valve member 58 is disengaged from the inner end of outlet nozzle 52. From the interior of bellows 57 an outlet pipe 59 leads to the interior of an air-operated motor or receiver, generally indicated at 60. Motor 60 comprises a casing 61, one wall of which is formed by a flexible bellows 62 to which is pivotally secured a connecting rod 63 which has pivotal engagement with a lever 64 rotatable on pivot 65 and connected at its opposite end with an extensible connecting link 19A connected to arm 20A of a three-arm lever pivoted at 20. Three-arm lever 20A—21 forms one input to a differential formed of connecting link 34, floating lever 35, pin 36 and link 37 leading to the second three-arm lever 38 bearing a pin 39 for engagement with flapper 40 to move flapper 40 with relation to nozzle 41.

Reset and rate device is composed of a casing 66 with one end of which the end of pipe 47 communicates so as to enter the space 67 surrounding the outer bellows 68 which is filled with oil or other liquid. Another wall enclosing the liquid within bellow 68 is formed by inner bellows 69 to the opposite side of the free end of which is secured a rod 70 having a pin 71 on it. The opposite end of rod 70 is connected to the inner side of the free end of inner bellows 72. Inner bellows 72 forms the inner flexible wall of a housing, the outer wall of which is formed by outer bellows 73 whose free outer surface is exposed to atmospheric pressure, and is stressed by a spring 74. Between the chamber formed by bellows 68 and 69 and the chamber formed by bellows 72 and 73 extends a pipe or conduit having a minimum cross section controlled by a throttling screw or like valve 76.

Pilot or relay valve 44 receives the end of the air inlet pipe 42 so that the inlet air is conducted to an inlet nozzle 77 with which cooperates a flapper 78. Flapper 78 also cooperates with the end of an outlet nozzle 79 secured between inner bellows 80 and outer bellows 81 so that the opposite end of outlet nozzle 79 communicates with atmosphere or other exhaust or waste for the discharge air. A casing 82 surrounds outer bellows 81 and forms with it an air-operated motor to which inlet air is conducted to a restriction 83 and from which a pipe 84 leads to nozzle 41. Any movement of flapper 40 relative to nozzle 41 causes a corresponding movement of bellows 81 so that outlet nozzle 79 is moved, either away from flapper 78 so as to permit an exhaust of air through outlet nozzle 79, or toward flapper 78, so as to open inlet nozzle 77 and admit air to the interior of inner bellows 80, outlet pipe 45 and the air-operated diaphragm or like motor 49 which forms the operating device for the final control element 50. This final control element 50 is shown, in this instance, as a valve controlling the flow through a pipe 100 leading to a control element 101 such as a tank containing the liquid whose level or flow actuates the measuring element to which float 1 is responsive.

The proportional action of control unit 48 is secured by moving the flapper 40 by means of the inside bellows 69 and 72, the rod 70 and the pin 71. Assume that the liquid between the bellows 68 and 69, within the conduit 75, and between the bellows 72 and 73 is sealed. The proportional action takes place as follows: When the float 1 moves away from the point at which the controller is set, the movement of float 1 is transmitted by the mechanical and pneumatic linkages, already explained, to the flapper-actuating pin 39. Assume that the pin 39 moves away from the set point in a direction to carry the flapper 40 away from the nozzle 41, the outlet pressure in pilot or relay 44 is reduced. The throttling bellows 68 will therefore expand to the right, reducing the liquid pressure on that side, while the liquid pressure on the left between bellows 72 and 73 remains momentarily the same as the atmospheric pressure on the outside of bellows 73. This unbalance of pressure causes the inner bellows 69 to move to the right, returning the flapper 40 toward the nozzle 41 in accordance with the proportional band setting.

The automatic reset action takes place as soon as the inside bellows 69 has moved away from its intermediate set point position. The liquid will flow from the high pressure side on the left to the low pressure side on the right, permitting the inside bellows 69 and 72 and the rod 70 carried thereby to move slowly to the left again towards its balanced position. This movement causes the flapper 40 to move away from the nozzle 41 and further to decrease the pressure on the control valve motor 49 at a gradual rate. Rod 70 carries pin 71 which engages a pivoted lever 85 which, in turn, engages the flapper-actuating pin 39.

If the change in the position of the final control valve 50 does not reflect through the process being controlled and the float 1 continues to remain away from the control point, the inside bellows system will continue to reduce the pressure on motor 49 until this pressure becomes zero. Therefore, the liquid pressures on the opposite ends of rod 70 can not equalize as long as the controller remains away from its set point.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a float-operated controller controlling the supply of air to an air-operated motor for a final control valve, a measuring unit having a null-balance, a pivotally mounted driving lever adapted for operation by the float, a pivotally mounted driven lever mounted for engagement by said driving lever, a spring stressing said driven lever in one direction, a cam providing driving engagement between said levers and movably mounted for adjustment along one of said levers to compensate for the differences between the specific gravity of various liquids being measured and adapted to be secured in adjusted position, a relay valve having an inlet for connection to a source of compressed air and an outlet for connection to the controller, an inlet valve controlling the connections between said outlet and said inlet, an exhaust valve controlling the connections between said outlet and waste for the air, and an air-sealing bellows stressed by said spring through said driven lever and having engagement with said inlet valve and said exhaust valve so as to operate one or the other of said valves in response to movements of said driven lever.

2. An air-operated mechanism for regulating a final control valve in response to the level of a liquid, including, a shaft pivotally mounted for rotation in response to movements of a float in the liquid being measured, a driving lever, adjustable mechanism securing said lever to said shaft so as to vary the position in which the float balances said driving lever, a driven lever pivotally mounted adjacent said driving lever, a cam providing driving engagement between said levers, fastening means for securing said cam to one of said levers and readily adjustable to vary the point of engagement between said levers so as to compensate for the specific gravity of the liquid being measured, an air-operated motor opposing movements of said driven lever in one direction, and a valve mechanism controlling a supply of air to said motor or the exhaust of air from said motor, said valve being mounted for operation in response to the joint movements of said motor and of said driven lever.

3. A float-responsive air-operated controller of a liquid level, including, a shaft mounted for oscillatory movement by a float, a driving lever, an adjustable connection between said shaft and said driving lever for varying the location of said driving lever when the float balances, a driven lever, a cam forming a driving connection between said levers, fastening means securing said cam in a selected adjusted position relative to said levers, the adjustment of said cam compensating for the specific gravity of the liquid being measured, a differential linkage, a link providing at least a part of a connection between said driven lever and one input to said differential linkage, an exhaust valve, a second link connecting the output of said differential linkage and said exhaust valve, an air-operated motor connected under the control of said exhaust valve so as to move in response to adjustments of said exhaust valve, a pilot valve having an inlet connection with a source of compressed air and an outlet connection with the motor of the final control valve, said air-operated motor operating said pilot valve, a first bellows mechanism connected to the off-take side of said pilot valve and controlling movement of said exhaust valve to provide control of the throttling type, a second bellows mechanism having restricted communication with said first bellows mechanism so as to vary the amount by which said first bellows mechanism adjusts said exhaust valve to provide the automatic reset type of control, and a pivotally mounted indicator cooperating with a large scale and connected to said link so as to be moved thereby to indicate the instantaneous level of the liquid being measured.

4. An air-operated controller responsive to changes in a variable and for moving an air-operated final control element, including, a pair of pivotally-mounted inter-engaging levers one of which is driven by a measuring element responsive to the variable, a connection adjustably secured to one of said levers for varying the point of engagement therebetween so as to compensate for changes in the variable being measured, a valve mechanism having an inlet connection to a source of compressed air and having an inlet valve and an exhaust valve, an air-sealing bellows movable in opposition to the movements of the driven one of said levers and having operating connection with said inlet and exhaust valves, a first air-operated motor connected under the control of said valve mechanism so that said valve mechanism controls the operating air pressure in said first motor, a differential linkage having one inlet thereto connected to said first motor, a second air-operated motor, a pilot valve driven by said second motor and having an inlet connection to a source of compressed air and an outlet connection to the motor of a final control element, an exhaust valve controlling the operation of said second motor, and an operating link from the output of said differential linkage to said exhaust valve for said second motor.

5. In an air-operated mechanism for operating a final control valve in response to the level of a liquid, means for compensating for changes in the specific gravity of the liquid being measured, including, a driving lever adapted to be moved in response to changes in the level of said liquid, a driven lever pivotally mounted adjacent said driving lever, a connector forming the point of engagement between said levers and having a pair of ears projecting through a slot in one of said levers so as to be guided therealong, a screw projecting through said slot and engaging with said connector to clamp said connector on one of said levers in an adjusted position, cooperating markings on said connector and one of said levers for indicating the ratio of the effective lengths of the lever arms of said levers at the adjusted position of said connector, an air-operated motor opposing movements of said driven lever in one direction, and valve mechanism controlling a supply of air to said motor or the exhaust of air from said motor, said valve mechanism being mounted for operation in response to joint movements of said motor and said driven lever.

References Cited in the file of this patent

UNITED STATES PATENTS

| Number | Name | Date |
|---|---|---|
| 1,597,480 | Quick | Aug. 24, 1926 |
| 1,917,092 | Bristol | July 4, 1933 |
| 2,003,883 | Grundstein | June 4, 1935 |
| 2,125,081 | Moore | July 26, 1938 |
| 2,199,730 | Piron | May 7, 1940 |
| 2,248,322 | Annin | July 8, 1941 |
| 2,258,719 | Saathoff | Oct. 14, 1951 |
| 2,285,288 | Krogh | June 2, 1942 |
| 2,303,890 | Moore | Dec. 1, 1942 |
| 2,311,853 | Moore | Feb. 23, 1943 |
| 2,369,571 | Jones | Feb. 13, 1945 |
| 2,386,108 | Gess et al. | Oct. 2, 1945 |
| 2,429,695 | McGrath | Oct. 28, 1947 |
| 2,461,026 | Bilyeu | Feb. 8, 1949 |
| 2,514,445 | Eckman | July 11, 1950 |
| 2,540,193 | Eckman | Feb. 6, 1951 |